(No Model.)  5 Sheets—Sheet 1.
J. R. KNAPP.
BLOW PIPE CONNECTION FOR GAS TANKS.
No. 370,067.  Patented Sept. 20, 1887.
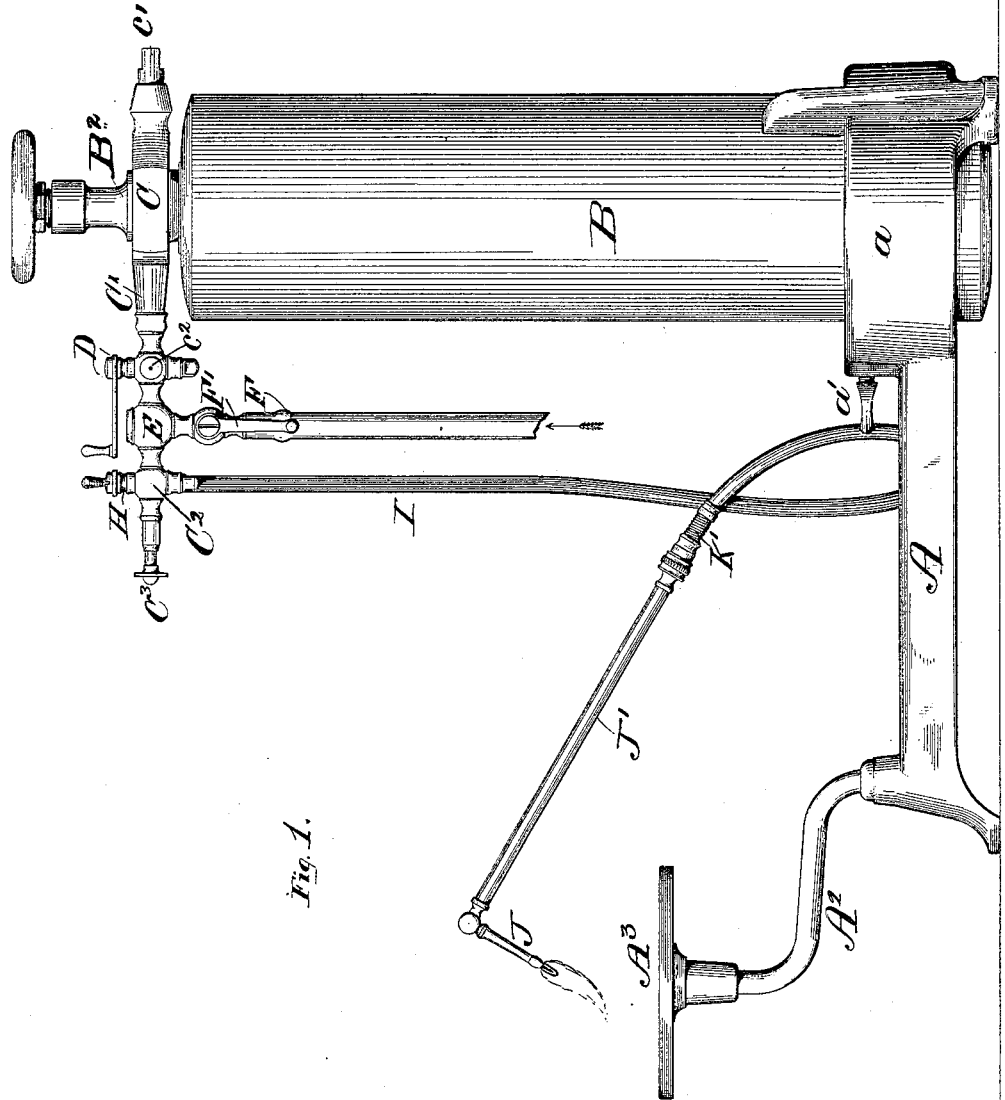
WITNESSES:
Edw. F. Simpson Jr.
Arthur C. Clarke
INVENTOR:
J. Rollo Knapp,
by his atty
Wm. S. Peyton.

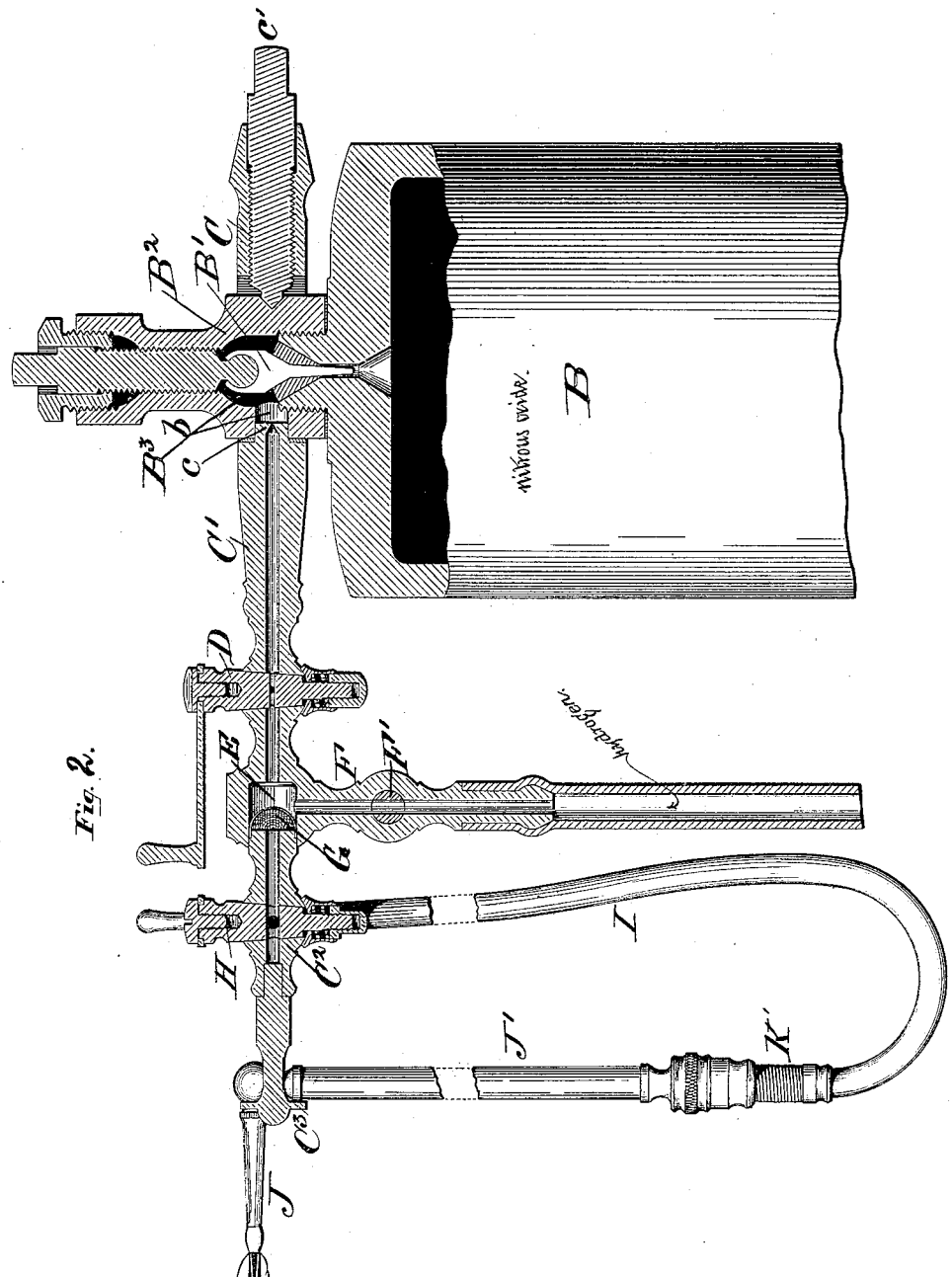

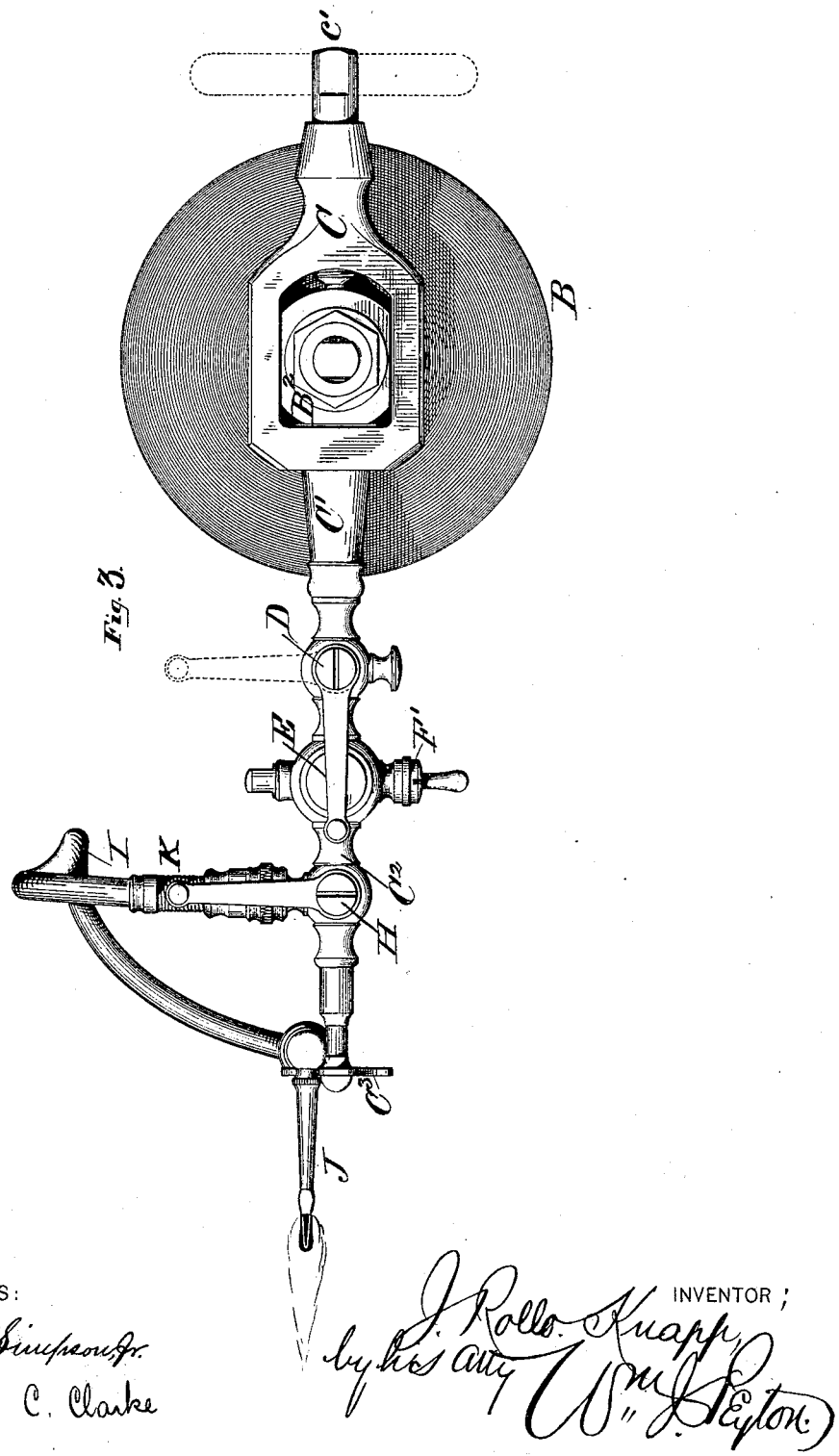

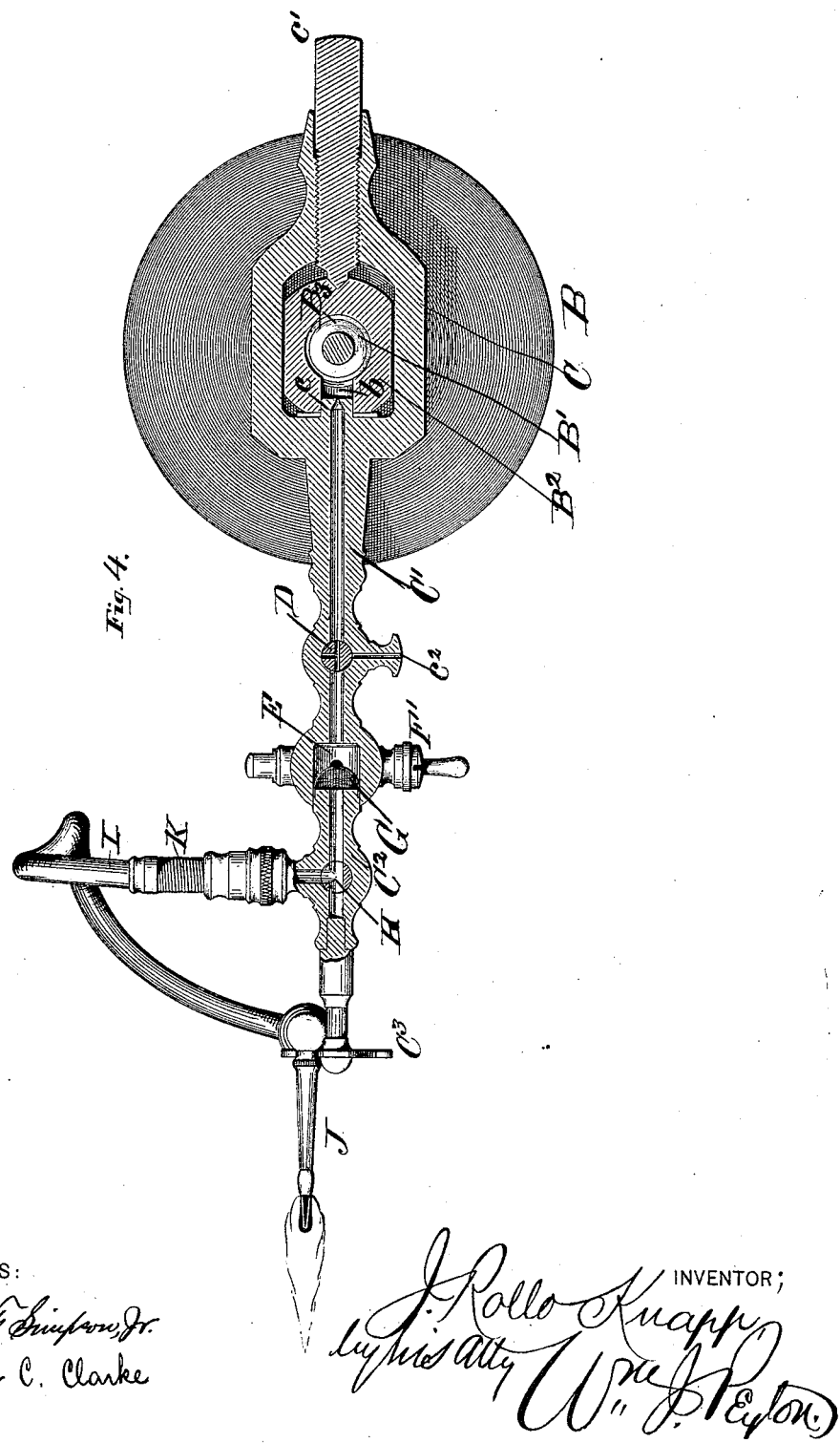

(No Model.)  5 Sheets—Sheet 5.
J. R. KNAPP.
BLOW PIPE CONNECTION FOR GAS TANKS.
No. 370,067.  Patented Sept. 20, 1887.
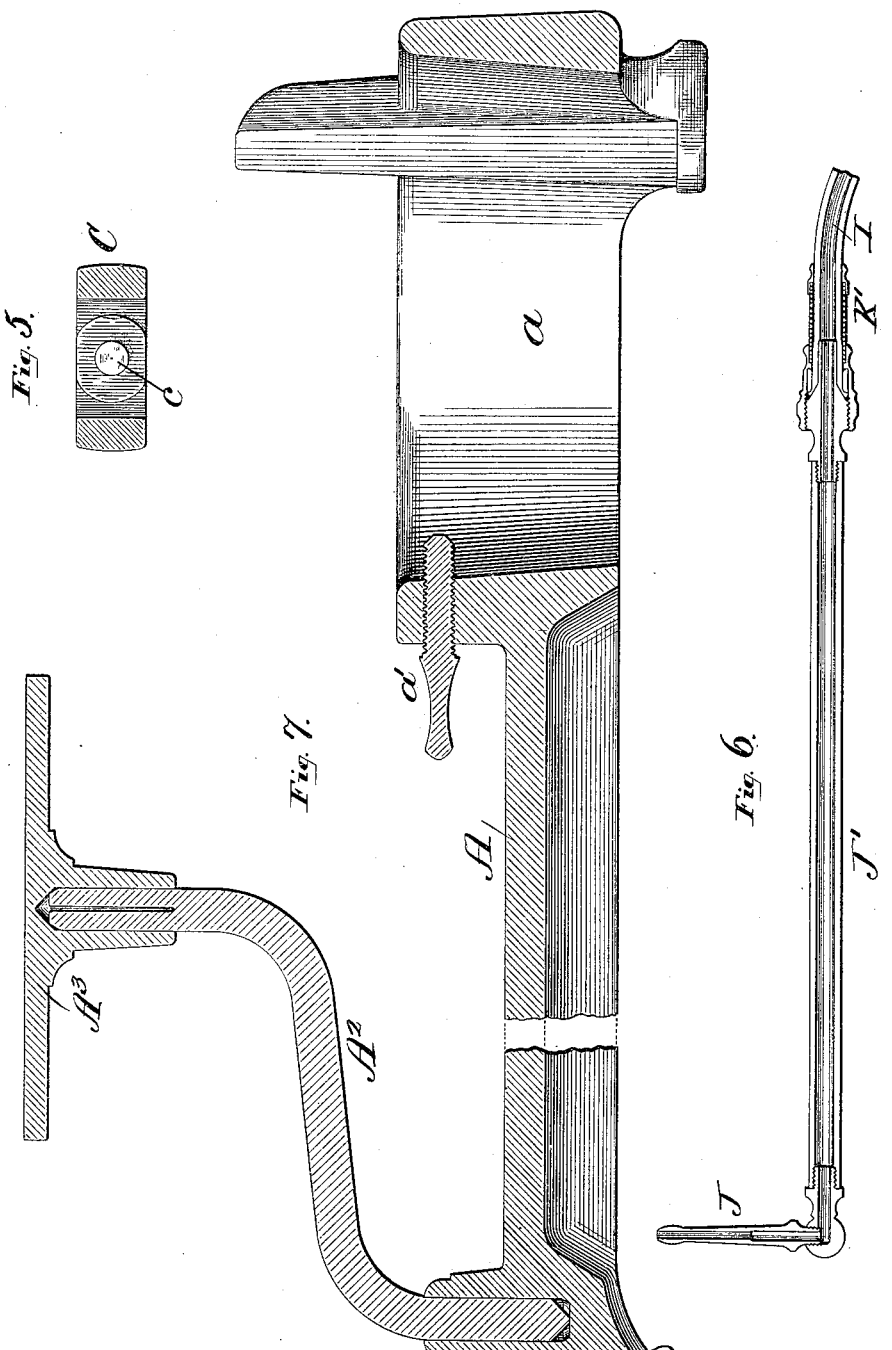
WITNESSES:
Edw. F. Simpson Jr.
Arthur C. Clarke
INVENTOR:
J. Rollo Knapp,
by his Atty Wm J. Peyton

UNITED STATES PATENT OFFICE.

JAMES ROLLO KNAPP, OF NEW ORLEANS, LOUISIANA, ASSIGNOR TO THE S. S. WHITE DENTAL MANUFACTURING COMPANY, OF PHILADELPHIA, PENNSYLVANIA.

BLOW-PIPE CONNECTION FOR GAS-TANKS.

SPECIFICATION forming part of Letters Patent No. 370,067, dated September 20, 1887.

Application filed December 10, 1886. Serial No. 221,240. (No model.)

*To all whom it may concern:*

Be it known that I, JAMES ROLLO KNAPP, a citizen of the United States, residing at New Orleans, in the parish of Orleans and State of Louisiana, have invented certain new and useful Improvements in Blow-Pipe Connections for Gas-Tanks; and I do hereby declare the following to be a full, clear, and exact description of the invention, such as will enable others skilled in the art to which it appertains to make and use the same.

My invention relates to an improved blow-pipe connection for gas-tanks.

I will describe my improvements in connection with a hydrogen blow-pipe to illustrate them; but it should be understood that said improvements, or some of them, may be utilized for other purposes—as, for instance, in the production of powerful lights after the manner of calcium or Drummond lights, for example, and for smelting and melting, heating, and lighting in other ways. I wish it to be understood that some of my improvements may be used without the others, and that the details of the apparatus hereinafter described may be changed and modified in many respects without departing from my invention or the claims herein made. It has heretofore been suggested that liquefied nitrous oxide may be used in connection with a hydrogen blow-pipe and for producing great heat and powerful lights, &c., and this use is largely facilitated by the fact that a great quantity of the gas can be confined in small space by condensing it into a liquid form in suitable vessels.

The object of my invention is to improve the method of feeding the nitrous-oxide gas from its containing cylinder or vessel to the point where it is utilized, and of mixing it with the hydrogen gas to secure combustion, and also the apparatus therefor, to the end that greater economy, safety, convenience, and practicality may result.

My said improvements are sufficiently described below, and my improved apparatus, as organized in all its parts in the best way now known to me for use as a blow-pipe, is sufficiently illustrated in the accompanying drawings to enable it to be clearly understood.

The subject-matter claimed herein by me as of my invention is particularly recited in the summary at the close of this specification.

In the aforesaid drawings, Figure 1 is a view in elevation of my improved apparatus, showing the blow-pipe nozzle above the table thereof and the oxyhydrogen flame as projecting from said nozzle. Fig. 2 is a vertical longitudinal section through the apparatus, except as respects the nozzle and its flexible pipe-connection. Fig. 3 is a plan or top view of the device, and Fig. 4 is a horizontal section through the upper portion thereof. Fig. 5 is a section through the yoke that fits the nitrous-oxide-containing cylinder, showing a face view of the constricted bore of the feed-pipe connection of said yoke through which the nitrous-oxide gas is fed to be mixed with the hydrogen gas and then delivered at the nozzle or jet of the apparatus. Fig. 6 is a longitudinal section through the front end of the blow-pipe connections and delivery-nozzle thereof, showing more particularly the handle portion and nozzle of such connections and the manner of connecting said handle portion with the front end of the flexible-pipe portion of the apparatus. Fig. 7 is a longitudinal section through the base or stand of the apparatus which supports the nitrous-oxide-containing cylinder and carries a pivoted table for use with the blow-pipe.

The base or stand A of the apparatus may be cast of metal in one piece, and has a seat, *a*, at one end for the reception of the lower end of the cylinder or vessel B, which is supported in an erect position, and may be locked in said stand by the set-screw *a'*. This cylinder B is or may be of the usual construction, and is supplied with nitrous oxide condensed from a gas into a liquid form, whereby a large quantity of the gas may be stored ready for use in a very compact form, the liquid volatilizing or assuming a gaseous form when permitted to escape from the cylinder by the opening of a strong tight-fitting valve, B', as usual. By liquefying the nitrous oxide a large quantity of oxygen is confined in a small compass under pressure, and is in a very desirable condition for use in connection with hydrogen as a blow-pipe and for a large variety of uses where intense heat and light are required. These cylinders, when emptied, are also readily refilled with the nitrous oxide and may be readily transported from place to place.

In order to feed the nitrous oxide in the form of gas from the containing-cylinder, I make use of a frame or yoke, C, adapted to fit the valve-casing $B^2$ of the cylinder, and provided on one side with a projecting pipe-extension, $c$, to enter and fit and meet the escape or outlet opening $b$ in said valve-casing $B^2$, and with a clamp-screw, $c'$, on the opposite side, by means of which the yoke may be caused to draw the pipe-extension $c$ tightly into or against the outlet-opening $b$. Said pipe-extension $c$ thus communicates with the valve-chamber $B^3$ of the nitrous-oxide-containing cylinder, and when the valve $B'$ is opened permits the nitrous oxide, as it assumes a gaseous form, to pass out through said pipe-extension, which communicates with or forms part of a feed-pipe connection, $C'$, constituting the feeding apparatus for the nitrous oxide.

The bore of the feed-pipe connection $C'$ is constricted or made very small at, preferably, the point where it communicates with the valve-chamber $B^3$ of the cylinder B, (see Figs. 2, 4, and 5,) so that when the cylinder-valve $B'$ is opened but a small stream of nitrous-oxide gas is permitted to pass into the feed-pipe connection $C'$. Said feed-pipe connection is fitted with a "test-opening," $c^2$, and with a two-way stop-cock, D, which, when turned in one position, causes its port or passage to communicate with the test-opening, and closes the bore of the feed-pipe in other directions. The force and quantity of the flow of gas can thus be felt by the finger placed over the test-opening, and the cylinder-valve $B'$ can then be regulated to permit of the escape or feed of just the quantity of the nitrous-oxide gas desired. Ordinarily—as for a blow-pipe for dentists' use, for example—the valve $B'$ should be adjusted or regulated so that the flow of the nitrous-oxide gas can just be felt.

Of course the amount of gas to be fed can be tested and ascertained and regulated in other ways; but the test-opening I have provided is a good and simple gage. When the flow of nitrous oxide has been regulated by the cylinder-valve $B'$, the cock D is turned so as to close the test-opening and permit the flow of the gas through the feed-pipe connection into a mixing-chamber, E, formed, preferably, in said pipe-connection.

A pipe-connection or feed-pipe, F, having a stop-cock, $F'$, communicates with the hydrogen-gas supply—for instance, an ordinary hydrogen or illuminating gas burner—and directs the hydrogen or illuminating gas, when turned on at the burner and when the cock $F'$ is opened, into the mixing-chamber E of my improved apparatus, where the small or attenuated stream of nitrous-oxide gas mingles with the stream of illuminating or hydrogen gas and the two are thoroughly mixed.

The combined gases are then preferably fed through a finely-perforated hood or diaphragm, G, fitted over the end of the feed-pipe section $C^2$, communicating with said mixing-chamber through the port or opening of the flame-regulating stop-cock H, fitted in said pipe-section $C^2$, and through a preferably flexible or rubber pipe, I, to the jet or nozzle J of the blow-pipe or apparatus, where the gas is ignited to do the work of the blow-pipe and to produce an intense heat, due to the abundant supply of oxygen in the nitrous oxide. The nozzle J is preferably made of platinum or some such metal having a high melting-point.

In some cases it may be desirable to fit the apparatus with two blow-pipes or heating jets or nozzles J of different sizes and capacity, for example, and in such cases the pipe-section $C^2$ may have opposite lateral pipe-extensions and corresponding nozzles and intermediate connections, and the stop-cock H may be a two-way cock, so that it may be turned to feed the combined gases to either nozzle desired and shut off the other. This is obvious, as shown by the two-way cock H. (See Figs. 2 and 4.) The other connections would or may be duplicates of those already shown at one side of the pipe section $C^2$.

The size of the flame of the jet or blow-pipe is or may be regulated by the stop-cock H, and said flame should be, to attain the best results, reduced in size to a very small cone, the greatest heat being developed, I have found, when the inside cone of the flame is reduced to its smallest size. If the regulating valve or valves is or are too much open, so as to supply too much nitrous oxide, the flame will be extinguished, and if too little is supplied the flame will be too large and will not develop so much heat.

The principal object of the hood or diaphragm G is to prevent the backward flow of the flame into and beyond the mixing-chamber for safety and to avoid all danger of explosions.

I have fitted on the extreme end of the feed-pipe connection $C'$, or, rather, of section $C^2$ thereof, a cross bar or plate, $C^3$, upon which to hang the nozzle or nozzles J when not in use, so as to support them out of the way. I have also provided the several stop-cocks with lever-handles, as will be seen, for convenience in turning or operating them, and the plugs of each of said cocks are preferably held to their seats by springs, as shown, so that they act as safety-valves as well as cocks. I have also fitted the flexible pipe-connection or tubing I where it is joined at one end to the pipe-section $C^2$ and at the opposite end to the butt-end of the handle portion $J'$ of the nozzle or jet J with flexible coiled-wire or spring sleeves K K′, to prevent sharp bending of the flexible pipes at those points and to support the flexible pipe at such points, so as to prevent its rapid destruction, which might otherwise take place by breaking or cracking. As respects the other portions of the unions or couplings of the ends of the flexible pipe or tubing I claim nothing new.

I prefer the yoke or frame C to be detachable, as shown, so that it may be readily fitted to or detached from the cylinder or receptacle B.

I have provided the base or stand A with a swinging or pivoted arm, $A^2$, supporting at its upper end a revolving table, $A^3$, for conjoint use with the blow-pipe or heating apparatus in supporting the work to be operated upon, &c.

In operation the supply of nitrous-oxide and hydrogen gas to the mixing-chamber is regulated, the combined gas is lighted at the end of the jet or nozzle, and the size of the flame is regulated as before described. The pressure of the nitrous-oxide gas is greater than that of the hydrogen or illuminating gas, and prevents any backflow of the latter into the feed-pipe connection immediately communicating with the valve-chamber of the nitrous-oxide-containing cylinder. The constricted opening or bore of the pipe-connection also acts to insure against this. The pressure also creates sufficient of a blast at the delivery end of the nozzle for any practicable purposes. Ordinarily the blast should not be of much force, as a blast of any considerable strength is in some cases, if not in most, undesirable.

Having sufficiently indicated the nature, objects, and some of the uses of my improvements, I will, without further elaboration, state that I claim herein as my invention—

1. The combination, substantially as hereinbefore set forth, of a yoke or clamp frame having connections to fit it for attachment to a containing cylinder or vessel, an oxygen-feed-pipe connection of said clamp-frame fitted to communicate with the outlet-opening of said vessel, a hydrogen-feed pipe communicating with said oxygen-feed-pipe connection, and a discharge or flame nozzle with which said feed-pipes communicate.

2. The combination, substantially as hereinbefore set forth, of the cylinder or vessel having an escape-valve, the clamp-yoke fitted to said vessel, the oxygen-feed-pipe connection communicating with the outlet of said valve through a feed-opening in said clamp-yoke and provided with a stop-cock therein, the second or hydrogen feed pipe communicating with said oxygen-feed-pipe connection and provided with a stop-cock therein, and the discharge or flame nozzle.

3. The yoke or frame having a feed-pipe connection provided with a constriction in its bore and having connections to fit it to a gas-containing cylinder, substantially as described.

In testimony whereof I affix my signature in the presence of two witnesses.

JAMES ROLLO KNAPP.

Witnesses:
   J. S. COFFEY,
   SAYRE B. KNAPP.